(12) United States Patent
Hain et al.

(10) Patent No.: US 7,050,214 B2
(45) Date of Patent: May 23, 2006

(54) OPTICAL COMPENSATION ELEMENT

(75) Inventors: Mathias Hain, Darmstadt (DE); Somakanthan Somalingam, Darmstadt (DE); Theo Tschudi, Darmstadt (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/250,513

(22) PCT Filed: Jan. 8, 2002

(86) PCT No.: PCT/EP02/00099

§ 371 (c)(1),
(2), (4) Date: Jul. 1, 2003

(87) PCT Pub. No.: WO02/056099

PCT Pub. Date: Jul. 18, 2002

(65) Prior Publication Data

US 2004/0051833 A1    Mar. 18, 2004

(30) Foreign Application Priority Data

Jan. 12, 2001   (DE) ................. 101 01 500
Mar. 29, 2001   (DE) ................. 101 15 702

(51) Int. Cl.
*G02F 1/03*   (2006.01)
*G02F 1/07*   (2006.01)
(52) U.S. Cl. ............... 359/254; 359/249; 359/295
(58) Field of Classification Search ........... 359/245, 359/254, 249, 271, 266, 290–1, 293, 295, 359/315
See application file for complete search history.

(56) References Cited

U.S. PATENT DOCUMENTS

| 5,572,344 A | 11/1996 | Jackson et al. ............... 359/58 |
| 6,560,001 B1* | 5/2003 | Igasaki et al. ............... 359/245 |
| 2003/0103708 A1* | 6/2003 | Galstian et al. ................ 385/1 |

FOREIGN PATENT DOCUMENTS

| EP | 258996 | 3/1988 |
| EP | 1011009 | 6/2000 |
| JP | 10-221703 | 8/1998 |
| WO | 01/48748 | 7/2001 |

OTHER PUBLICATIONS

Patent Abstracts of Japan, vol. 1998, No. 13, Nov. 30, 1998 & JP 10-221703.
S. Stallinga et al. "Liquid Crystal Aberration Compensation Devices" Optical Storage and Optical Information Processing, Taipei, Taiwan, Jul. 26-27, 2000, vol. 4081, Proceedings of the SPIE, pp. 50-59.
Copy of Search Report dated May 29, 2002.

* cited by examiner

*Primary Examiner*—Jordan M Schwartz
*Assistant Examiner*—Jessica Stultz
(74) *Attorney, Agent, or Firm*—Joseph S. Tripoli; Harvey D. Fried; Patricia A. Verlangieri

(57) ABSTRACT

The invention relates to an optical compensation element comprising a first transparent surface on which a transparent electrode is arranged; a second transparent surface on which a plurality of transparent main electrodes are arranged, several of which being respectively connected to control electrodes via a transverse electrode; and a material having a refractive index which changes according to the voltage applied, said material being arranged between the first and second transparent surfaces. The aim of the invention is to improve said compensation element. To this end, each main electrode is connected to a transverse electrode at a precise location.

8 Claims, 8 Drawing Sheets

OPTICAL COMPENSATION ELEMENT

This application claims the benefit, under 35 U.S.C. § 365 of International Application PCT/EP02/00099, filed Jan. 8, 2002, which was published in accordance with PCT Article 21(2) on Jul. 18, 2002 in German and which claims the benefit of German patent application No. 10101500.3, filed Jan. 12, 2001 and German patent application No. 10115702.9 filed Mar. 29, 2001.

BACKGROUND OF THE INVENTION

The present invention relates to an optical compensation element for influencing wavefronts, as claimed in the pre-characterizing clause of claim 1.

A compensation element such as this is known from JP 10-221703.

SUMMARY OF THE INVENTION

One object of the invention is to propose a compensation element which is better than this.

For this purpose, the invention provides that each main electrode, or a majority of the main electrodes, be connected to a transverse electrode at one, and only at one, point. This has the advantage that up to 50% of the contact electrodes can be saved. In contrast to the main compensation element, there is no need in this case to match the electrical voltages on both sides of the main electrodes precisely to one another. This results in greater design freedom, since a connection need be provided on only one side of the main electrodes. Furthermore, the number of drive electrodes that are required is reduced.

If the transverse electrode and drive electrode are composed of the same material, with the cross section of the transverse electrode being smaller than that of the main electrode, then this has the advantage of a large voltage drop along the transverse electrode, so that a large potential change can be achieved in a short distance. The voltage drop on the transverse electrode is in this case greater than on the drive electrode, and the transverse electrode does not need to have a high resistivity. A further advantage is that a small voltage drop occurs on the main electrode, thus allowing faster potential changes to be achieved and a potential which is as uniform as possible to be achieved over the entire main electrode, even when using smaller resistances.

The main electrodes are advantageously arranged in an essentially rotationally symmetrical manner and have a constant voltage with the same mathematical sign for a constant radius. This has the advantage that, when a large number of switching materials are used, for example ferroelectric liquid crystals, the same switching response, that is to say the same optical change, is obtained over the ring which corresponds to a specific radius. If a nematic material is used as the switching material, the applied voltages may also have different mathematical signs since this has no influence on the optical effect that can be achieved with these materials. However, in the case of other switching materials, different mathematical signs would result in a different reaction. Depending on the desired phase correction profile, geometries other than rotationally symmetrical geometries may also advantageously be used.

The invention provides that the main electrodes are in the form of virtually closed rings with different radii, and are connected to the transverse electrode on their sides opposite the opening of the ring. This has the advantage that as large a proportion as possible of the available area is covered by the desired main electrode shape, and only a small portion of the surface is occupied by the transverse electrode, that is to say for supplying potential, if the transverse electrode is passed through the opening in the respective rings. A circular area is advantageously covered with as high a filling factor as possible and with the main electrodes arranged closely adjacent to one another, but not touching one another. The transverse electrode advantageously has a broader cross section in the area of the openings in the rings. This has the advantage that a greater voltage drop occurs on the transverse electrode in the area of the connection to the respective rings. This results in a wider usable potential range with a lower operating voltage. The potential which is tapped off from the transverse electrodes is held via the rings of the respective main electrode. This results in a potential profile which rises or falls in a rotationally symmetrical manner from the outside inward. The shape of the potential profile is governed by the choice of the tapping points on the transverse electrode.

According to one development of the invention, a correction electrode is arranged between the main electrodes. In this case, the correction electrode can be driven by means of a further drive electrode. The provision of one or more such correction electrodes has the advantage not only that it makes it possible to achieve a continuously rising or falling potential profile, but any desired potential profile.

The invention provides for both surfaces of the compensation element to have structured electrodes. This has the advantage that different optical effects are achieved or compensated for by different structuring of the electrodes. Not only rotationally symmetrical arrangements, but also surface distributions other than these are provided in this case. In this way, it is possible to compensate for tilt, focus, defocus and/or astigmatism, with potential profiles being provided in which a cylindrical lens, a wedge, a spherical lens and/or a nonspherical lens are combined in a single compensation element.

Different voltages are advantageously applied to the transverse electrode. The invention provides for the transverse electrode to have a variable cross section. This has the advantage that any desired nonlinear voltage drop is achieved, and hence a potential profile with a nonlinear rise. Any desired phase form of the compensation element can thus be achieved by modulation of the transverse electrode in this way.

Supply electrodes are advantageously arranged between the main electrode and the transverse electrode, with their contact points with the transverse electrode being arranged such that they are not equidistant. This represents an advantageous further variant for optimizing the potential profile.

According to the invention, different voltages are applied to the drive electrodes. This has the advantage that different voltages are applied to the main electrodes depending on the desired phase profile, with different phase profiles being achieved by varying the potential profiles in this way in conjunction with the phase shift/voltage characteristic of the material that is used. Different potential profiles can thus be achieved for the same voltage difference on the drive electrodes It is likewise advantageous to apply different voltages to electrode structures which are arranged on opposite sides of a material with a variable refractive index. Even if, in the simplest case, a first of these electrode structures is flat, this allows the zero point of the potential which is applied to the other electrode structure of the transverse electrode to be shifted along the transverse electrode by varying the voltage which is applied to the first electrode structure. This allows different phase profiles to be achieved without any need to change the voltage which is applied to the other electrode structure.

An appliance according to the invention for reading and/or writing to optical recording media has a compensation element according to the invention. This has the advantage that it is possible to compensate for wavefront disturbances that occur, for example due to tilt or to a different layer thickness, particularly in the case of optical recording media with a high storage density. Wavefront disturbances such as these have a particularly critical influence on the accuracy of reading and writing to such optical recording media. These wavefront disturbances are optimally compensated for in an appliance according to the invention.

BRIEF DESCRIPTION OF THE DRAWINGS

Further advantages of the invention are also contained in the following description of exemplary embodiments. It is self-evident that the invention is not restricted to the described examples, but also includes modified forms with which those skilled in the art will be familiar.

In this case.

DETAILED DESCRIPTION

A compensation element according to the invention uses, by way of example, liquid crystals which modulate the phase of an incident light beam as a function of a local electrical field, as the material with a variable refractive index. In particular, liquid crystal elements with particularly efficient electrode structures are described in the following text. In this case, internal voltage drops are produced, which are available to the electrodes that modulate the wavefronts. This step allows a large number of electrodes to be operated with a low level of drive complexity. The large number of electrodes allows a high-resolution representation of the phase profile, and hence good correction of the wavefront. In particular, the elements are constructed such that they will also compensate for wavefront faults which vary with time. The method of operation will be described first of all with reference to two elements for correction of coma and spherical aberration.

The liquid crystal elements described here are used for correcting wavefront faults such as coma, spherical aberrations, etc. in optical systems. In this case, they are distinguished by an electrode structure which is as simple as possible, but which nevertheless is rich in tricks and restricts the drive that is required to a minimum. The drive is provided by only drive voltage, preferably an AC voltage at 1 kHz and at an amplitude, which can be regulated, of about 2–10 V. The internal voltage drops which are produced in the electrode structure make it possible to produce continuous wavefront deformations. In the exemplary embodiments, the electrode structure comprises only one transparent, conductive layer of indium tin oxide, also referred to as ITO, with a homogeneous surface resistance, and which can thus be produced very easily. Other transparent conductive materials such as polymers, etc., may, however, also advantageously be used for this purpose.

The elements which are described in the following text are used to compensate for coma or spherical aberrations, in particular in an appliance for reading or writing to optical recording media, for example a DVD pick-up head. Particularly in the case of future generations of such appliances, which will use shorter wavelength light sources, active compensation will be required. The trend for DVDs is to use objective lenses with a numerical aperture of NA=0.85, with a protective layer thickness of 0.1 mm. The spherical aberrations which occur when switching between different layers, for example from layer I to layer II, of a multilayer optical recording medium must be compensated for. If the substrates are relatively thick, the tolerances for disk tilting can be widened considerably by active tilt compensation.

Figure 1:
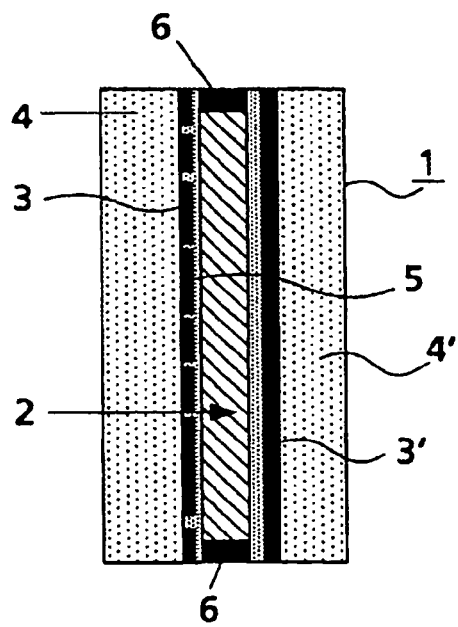
FIG. 1 shows a cross section through a compensation element.

The compensation element which is shown in the form of a cross section in FIG. 1 and is in the form of a liquid crystal compensation element 1 uses the local change in the refractive index in a thin liquid crystal layer 2 to modulate the wavefront.

The local refractive index distribution is produced by a suitable electrode structure 3, and can be varied by the applied voltage. Meshing techniques, that is to say voltage drops which are produced on the electrode structure 3, can be used to drastically reduce the number of electrodes that need to be driven. FIG. 1 shows a cross section through an element such as this. The electrode structures 3, 3' are composed of transparent conductive material, in this case indium tin oxide ITO, and are applied to glass substrates 4, 4' by means of photolithography. A layer of polyimide 5 is used for standard orientation of the liquid crystals 2, and is rubbed in the preferred direction after being spun by spin coating. The cell is filled with liquid crystals 2 in a vacuum, and is finally sealed.

Spacers 6 prevent contact between the two electrode sides, and govern the cell thickness. The electrode structure 3' is in this case shown as a ground electrode without any special structure.

Figure 2:
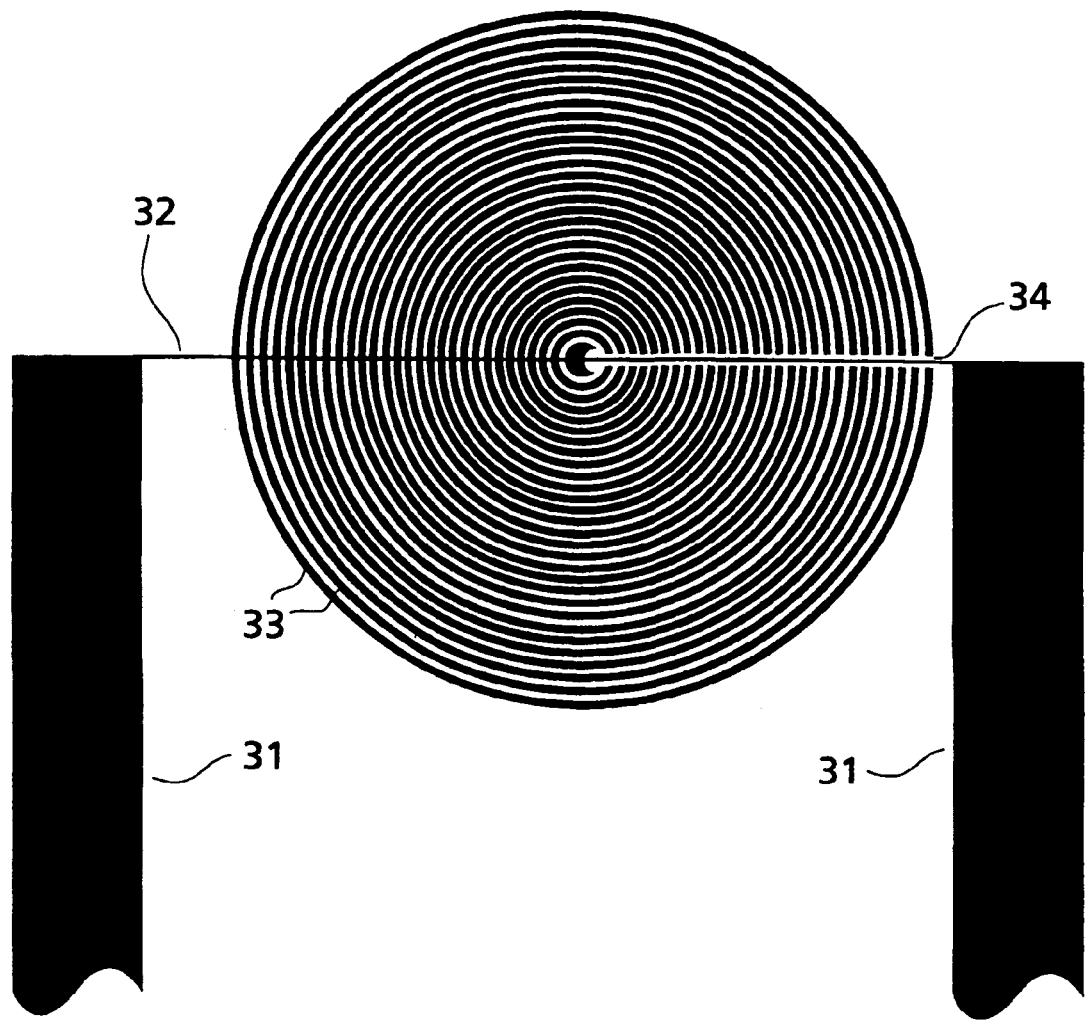
FIG. 2 shows an electrode structure for spherical aberration.

An electrode structure for spherical aberrations is described in FIG. 2. The electrode design that is shown in FIG. 2 allows compensation for wavefronts similar to a conical or spherical form. Only two drive electrodes 31 are required in this case. Two or more Pi phase modulations can thus be achieved depending on the cell thickness of the liquid crystal layer and on the material that is used.

A thin transverse electrode 32 is fed with the aid of two broad drive electrodes 31. Since they are narrow, they have a far greater resistance for the same surface resistance. The voltage which is dropped on the drive electrodes 31 is thus virtually entirely dropped across the transverse electrode 32. The respectively desired potential is picked up by means of the main electrodes 33 at different positions along the transverse electrode 32. The main electrodes 33 are thus at the respectively associated potential. The number of phase stages and phase profiles, such as linear, logarithmic profiles, etc., can be achieved by the number and the position of the tapping points.

In this exemplary embodiment, the main electrodes 33 are in the form of circular rings, which are connected in the left-hand part to the transverse electrode 32 while, to the right of the center, they each have an opening 34 through which the transverse electrode 34 is passed to the right-hand drive electrode 31.

Figure 3:
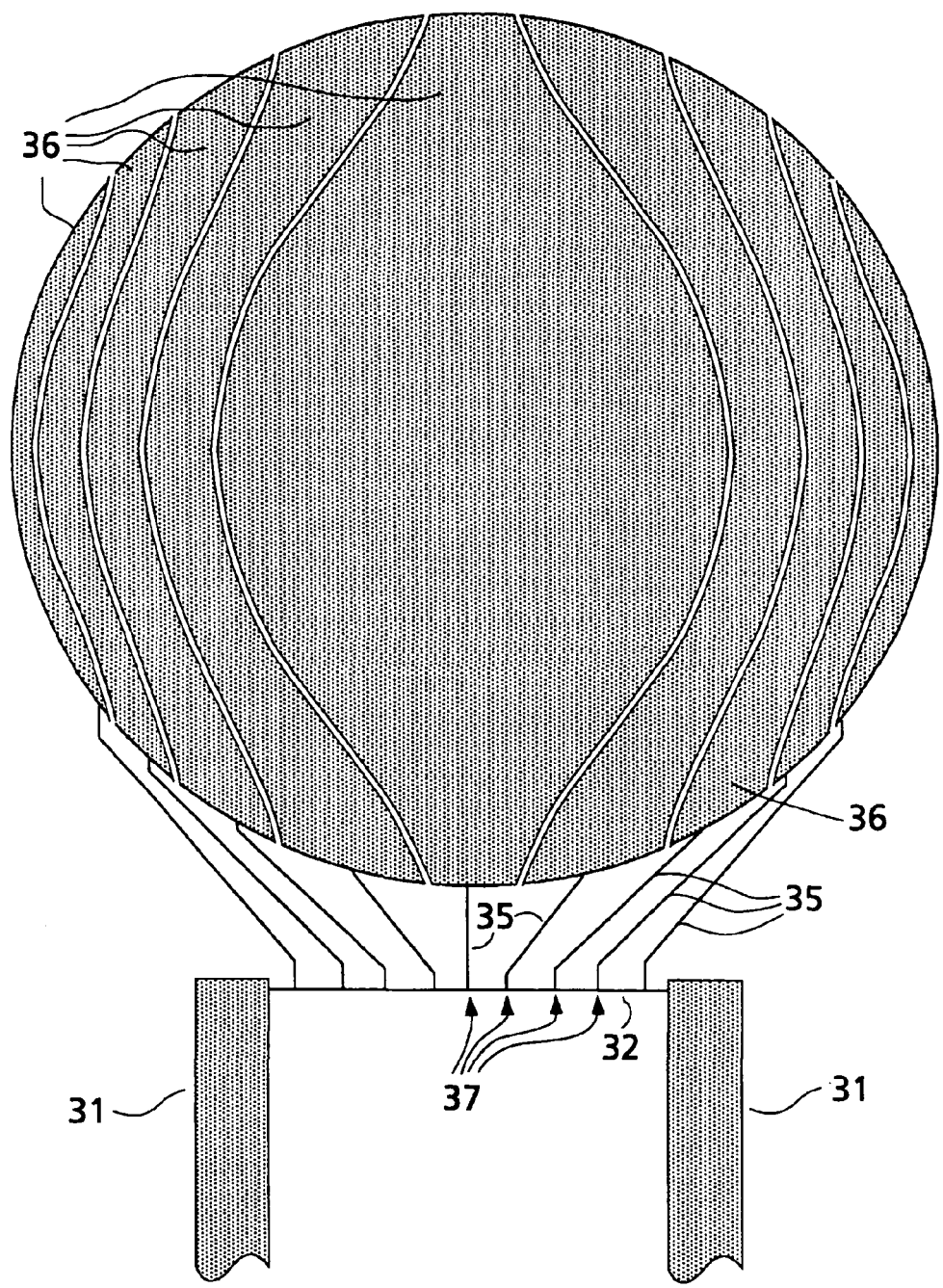
FIG. 3 shows an electrode structure for coma aberration.

An electrode structure for correcting coma aberrations is described in FIG. 3. The illustrated electrode design makes it possible to compensate for wavefronts similar to coma. Only two drive electrodes 31 are likewise required in this case.

The difference from the spherical correction element shown in FIG. 2 is in the nature of the voltage tap. The transverse electrode 32 which is responsible for the voltage drop is now located outside the modulating area. Supply electrodes 35 tap off the desired potential from the transverse electrode 32, and pass it to the main electrodes 36.

The shape of the main electrodes 36 is in this case dependent on the desired phase modulation and on the potential distribution required for this purpose. The number of main electrodes 36 is dependent on the desired phase quantization. The potential on each individual main electrode 36 is optimized by means of a suitable potential tap at the tapping points 37 of the transverse electrode 32 over a specific operating range in the liquid crystal curve, see also FIG. 4 in this context, in order to allow correction that is as efficient as possible.

The choice of the operating voltage range and the choice of the tapping points 37 offer two degrees of freedom, which are required for continuous modulation.

Figure 4:
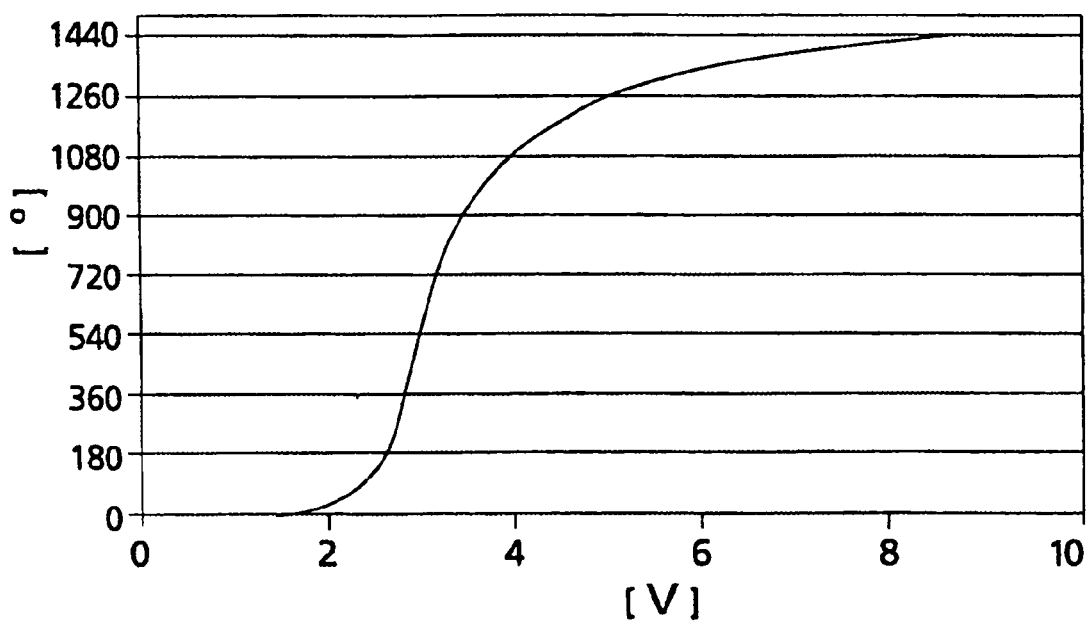
FIG. 4 shows a phase shift/voltage characteristic.

The characteristic for the liquid crystal drive technique as illustrated in FIG. 4, and which is also referred to as a liquid crystal calibration curve, shows the local phase shift in degrees [°] for a compensation element with the local potential predetermined by the electrode structure, plotted in volts [V]. This phase shift/voltage characteristic shows the phase shift that occurs when a potential difference is applied to the electrode structures 3, 3'. A phase profile that is as suitable as possible is produced by suitable choice of the drive range in conjunction with the choice of the tapping points 37 on the transverse electrode 32.

By way of example, a potential between 3.5 volts on the innermost ring and 5.2 volts on the outermost ring of the main electrodes 33 is recommended, in order to form profile whose curvature is as spherical as possible, for spherical correction. The profile can be optimized toward an ideal spherical shape by suitable choice of the tapping points 37 along the transverse electrode 32. If a differently curved profile is desired, then the range between about 2 volts and 2.7 volts may be used, and a fairly linear range occurs, for example, between 2.7 volts and 3.3 volts, and, for example, above 6 volts.

The following should be noted with regard to the switching response and the switching times: the switching time of nematic liquid crystals depends essentially on the cell thickness and on the material that is used. The maximum achievable phase shift is in this case directly proportional to the cell thickness. Switching times of less than 10 ms can be achieved with nematic materials for correction of a wavefront with a peak to valley value of less than half lambda, that is to say less than half the wavelength of the light being used. For two or more lambda, it is only possible to achieve switching times of several hundred milliseconds.

Different liquid crystal mixtures exist, as well as other materials such as crystals, polymers, polymer liquid crystal combinations, which can be used as phase-shifting materials in elements such as these. Nematic liquid crystals are a highly suitable material for switching processes which are not too fast and are in the range from a few tens of milliseconds up to seconds, owing to their high birefringence with good transmission characteristics, low drive voltages, good polarization characteristics and low costs. Different materials must generally be used to reduce the switching times. However, these have other disadvantageous effects. In the case of crystals, these are, for example, the small change in the refractive index and the high drive voltages or, in the case of ferroelectric liquid crystals, the low birefringence with characteristics that change the polarization. If the idea according to the invention is used for faster materials such as these, then the disadvantages that have been mentioned become a secondary factor in comparison with the advantages which are achieved according to the invention.

The internal voltage drop which is made use of by the invention as described above also makes it possible to produce more complex electrodes and the phase profiles associated with them, for example a combined coma spherical element or 2D coma correction element. Liquid crystal compensation elements for the correction of aberrations have until now been produced only with direct supply lines to individual surface electrodes. In this case, the individual main electrodes are driven directly. Elements such as these have very large sudden phase changes, whose magnitude is governed by the number of control electrodes. In the case of a wavefront correction of 1*▓, the wavefront is corrected only in steps of ▓/5, assuming five drive electrodes. The elements according to the invention require only a single drive voltage and, furthermore, allow much finer phase quantization. By way of example, this is ▓/50 for fifty main electrodes.

The concept according to the invention of the voltage tap for compensation elements 1 as well as the concept of the supply electrodes 35 for main electrodes of any desired shape are particularly advantageous, as are the electrode design and the element for compensation for spherical aberrations and coma. Elements with different, opposite electrode structures are also provided according to the invention. In this case, according to the invention, electrode structures 3, 3' are arranged on the opposite glass substrates 4, 4'. Coma and spherical aberrations are thus compensated for, for example, in one element. Elements according to the invention with relatively complex main electrodes allow any desired aberrations, switchable arrays such as checker gratings, wedge arrays, etc., asymmetric spherical correction, any desired radially symmetrical corrections or special functions that are locally integrated in the element. The scope of the invention likewise includes elements with internal electrodes that use the potential drop more than once. Not only solutions with two or more transverse electrodes 32 and one voltage supply but also solutions with two or more transverse electrodes 32 and two or more voltage suppliers are provided in this case. Multilayer electrode structures according to the invention can be produced, for example, with isolation layers and voltage conduits.

Further exemplary embodiments are described in the following text. These illustrate variants with particularly efficient electrode profiles for correcting the wavefront. All the extensions to the electrode structure which are illustrated in the following figures are used to produce rotationally symmetrical phase profiles which now have virtually any desired form. The examples mentioned above mainly describe spherical profiles, but also include the nonspherical profiles that are described in more detail here. The graphs provide a schematic illustration of the voltage profile dropped across the transverse electrode. The phase shift which results in the liquid crystal layer is achieved with the aid of the phase shift/voltage characteristics shown in FIG. 4. Wavefronts corrected in different ways can thus be produced depending on the voltage range that is chosen.

Figure 5:
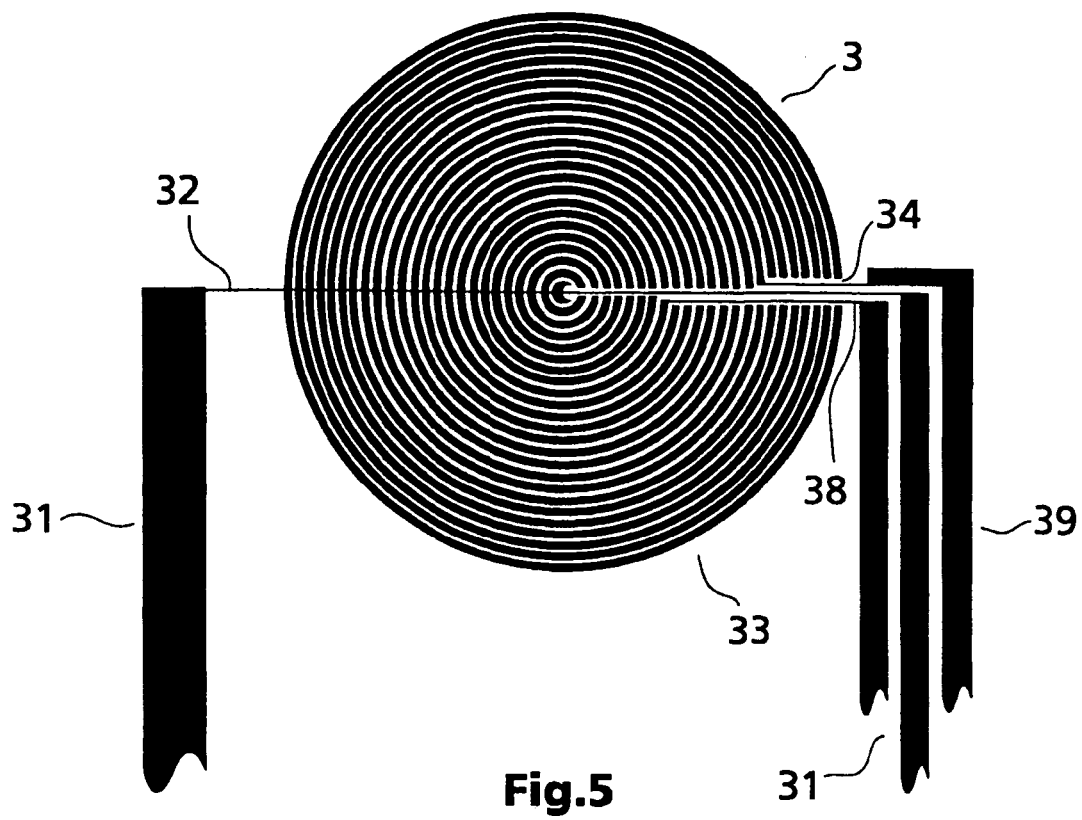
FIG. 5 shows an electrode structure with a correction electrode.

FIG. 5 shows an electrode structure according to the invention with correction electrodes, drive electrodes 31, a transverse electrode 32 and main electrodes 33 corresponding to those described in conjunction with FIG. 2. The opening 34 is kept somewhat broader and allows correction electrodes 38, 39 which are connected to at least one of the main electrodes 33 to be passed through.

Figure 6:
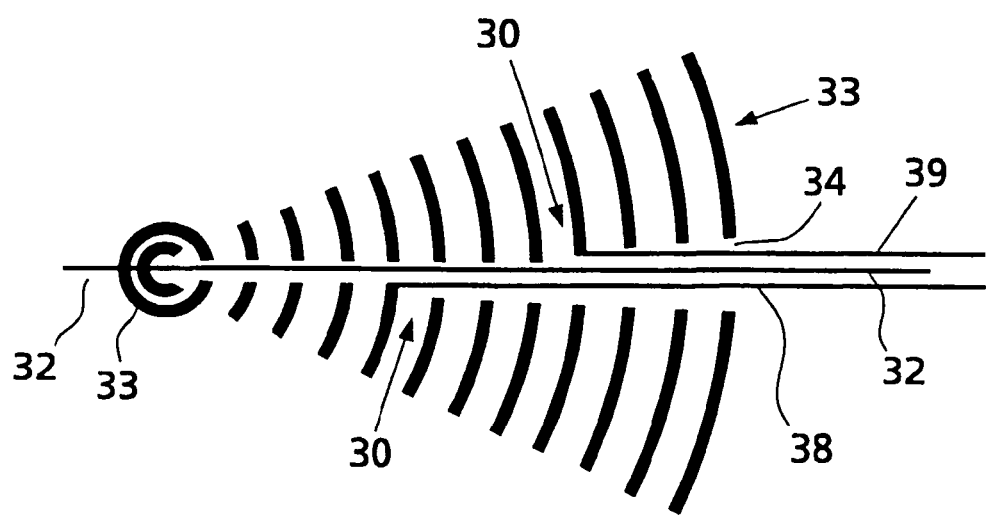
FIG. 6 shows a view of a detail from FIG. 5.

This is illustrated in detail in FIG. 6. This shows the transverse electrode 32 and the main electrodes 33, which are illustrated only partially or at most incompletely, as well as the correction electrodes 38, 39. Like the transverse electrode 32, these are passed through the opening 34 and are connected at contact points 30 to in each case one of the transverse electrodes 33. Since this main electrode 33 is also connected to the transverse electrode 32 in the left-hand area of the electrode structure 3, which is not shown here, this also changes the potential profile on the transverse electrode 32. This extended spherical electrode profile makes it possible to achieve improved phase matching or production of higher-order rotationally symmetrical profiles. The correction electrodes 38, 39 are used to vary the spherical profile.

Figure 7:
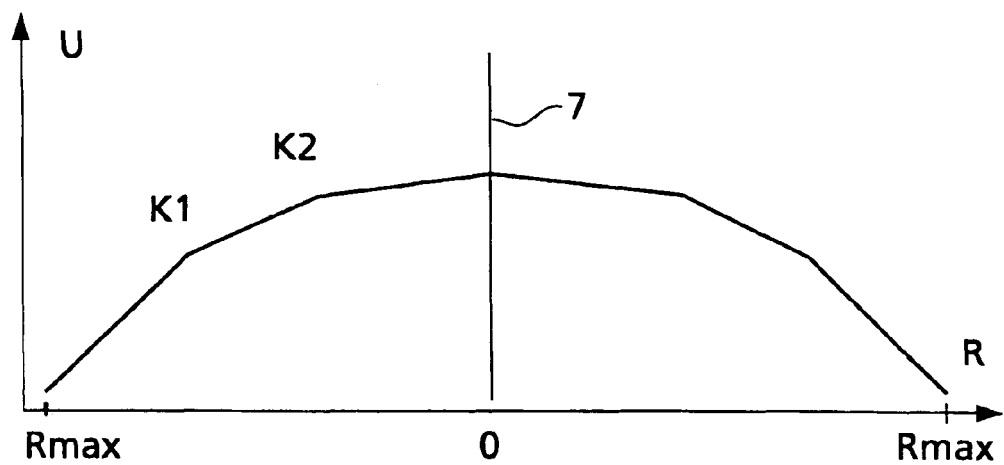
FIG. 7 shows the voltage drop across the transverse electrode according to a first variant relating to FIG. 5.

FIG. 7 shows the voltage drop U, plotted along the vertical axis, against the radius R plotted on the horizontal axis. The mirror-image axis 7 for the voltage profile is shown by the radius R=0, that is to say at the center of the annular main electrodes 22. K1, K2 denote the points at which the correction electrodes act. As can be seen, the potential profile between the maximum radius Rmax and the points K1, K2 at which the correction electrodes act is virtually linear, while there is a kink at the points K1, K2.

Figure 8:
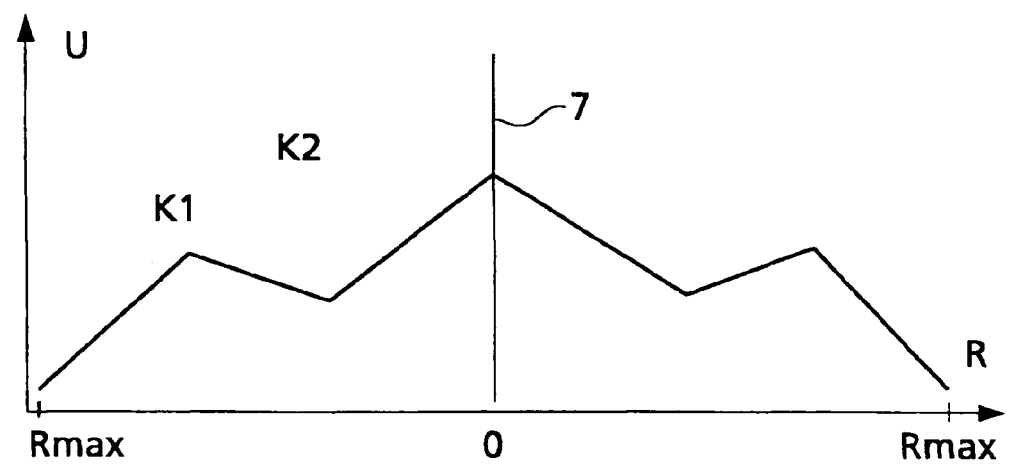
FIG. 8 shows the voltage drop across the transverse electrode according to a second variant relating to FIG. 5.

FIG. 8 shows a different profile of the voltage drop corresponding to FIG. 5, with the voltages on the correction electrodes 38, 39 being chosen such that the gradient between the points K1 and K2 is opposite to that in the rest of the profile.

Figure 9:
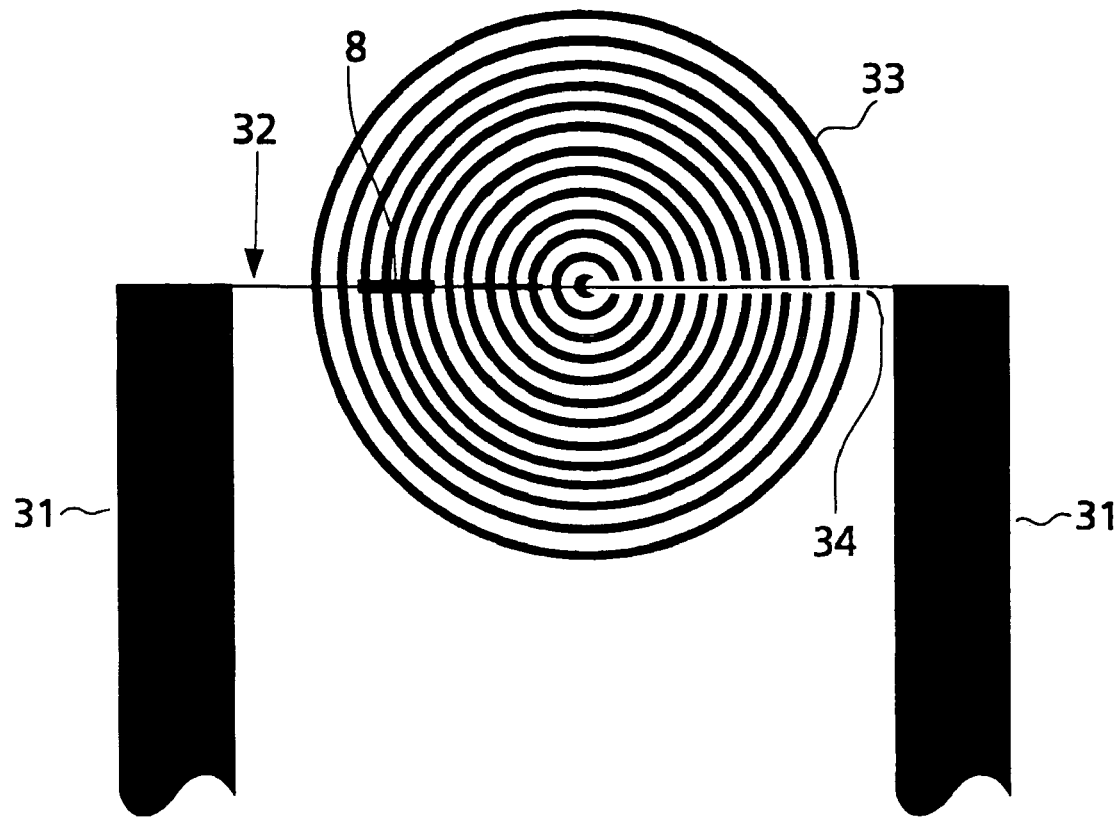
FIG. 9 shows an electrode structure with a modified transverse electrode.

FIG. 9 shows an electrode structure with a modified transverse electrode 32. As described in conjunction with FIG. 1, the transverse electrode 32 in the left-hand area is connected to the main electrodes 33, while an opening 34 is provided in the right-hand area. The transverse electrode 32 is provided with thickened regions 8 in the left-hand area. Its resistance is thus changed locally, that is to say the voltages that are tapped off vary with respect to one another despite the distance between the tapping points being the same. Once again, this allows the wavefront to be ideally matched to the desired characteristics.

Figure 10:
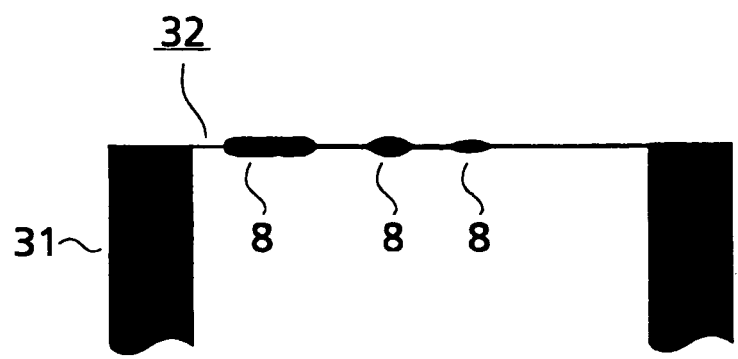
FIG. 10 shows a view of a detail from FIG. 9.

FIG. 10 shows the modified transverse electrode 32 illustrated schematically and enlarged. The thickened regions 8 in this case not only exist in constant broadened regions of the cross section, which are uniform and extend over a certain range, but are also produced in irregular broadened regions, as illustrated further to the right.

Figure 11:
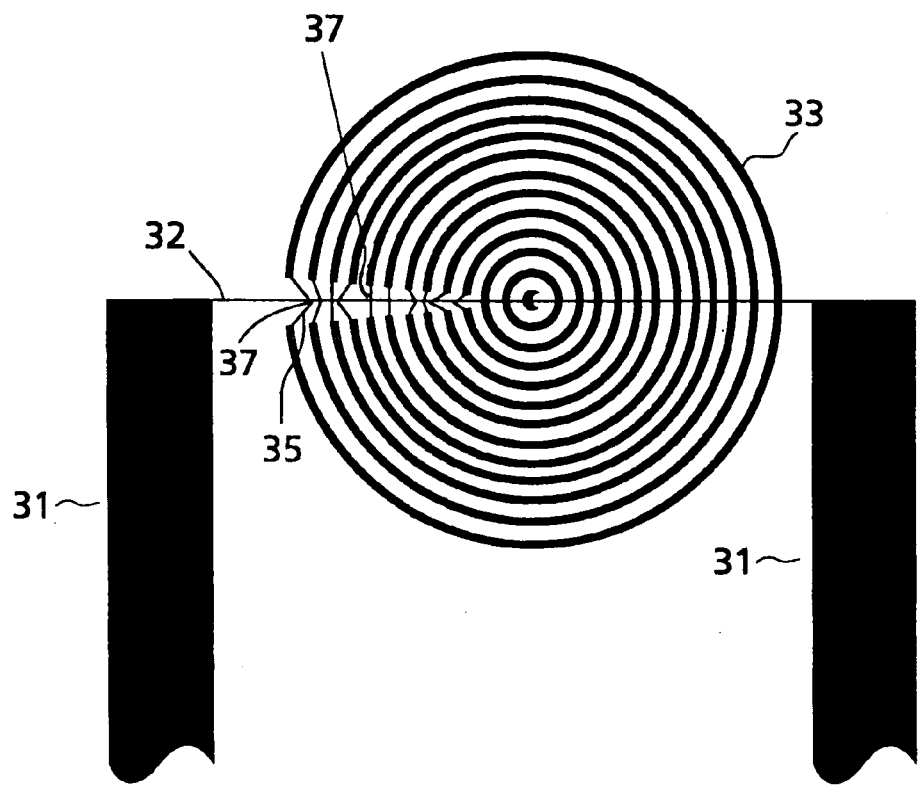
FIG. 11 shows an electrode structure with a variable tap.

FIG. 11 shows the electrode structure from FIG. 2 with a variable tap on the transverse electrode 32. The tapping points 37 at which the main electrodes 33 are connected to the transverse electrode 32 are no longer arranged at equal intervals, in contrast to FIG. 2, but are separated by different distances from one another. Supply electrodes 35 are provided for the connection between the transverse electrode 32 and the main electrodes 33.

Figure 12:
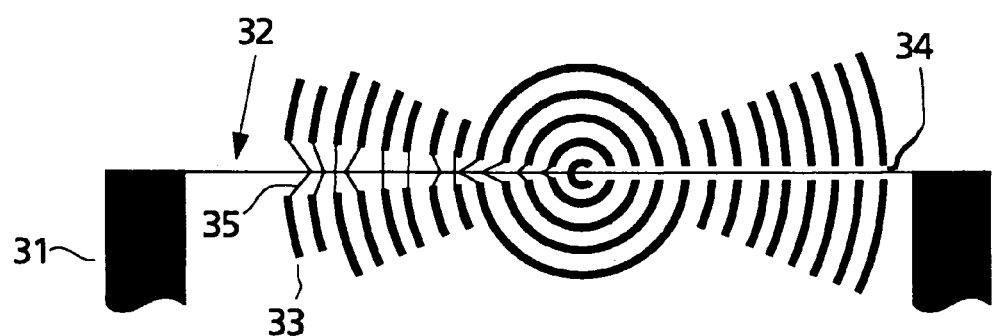
FIG. 12 shows a view of a detail from FIG. 11.

A detail of this is shown in FIG. 12.

Figure 13:
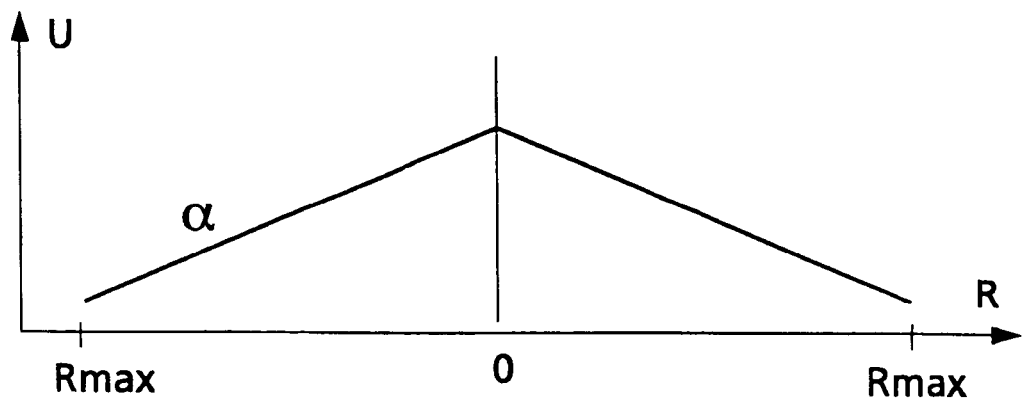
FIG. 13 shows the voltage drop for a transverse electrode with a constant cross section.

FIG. 13 shows the voltage drop for a transverse electrode with a constant cross section. The graph in this case corresponds to those in FIGS. 7 and 8. This shows the linear profile over the radius with the gradient angle $\alpha$. In this case, $\alpha$ cannot exceed the maximum value of $\alpha max=45°$.

Figure 14:
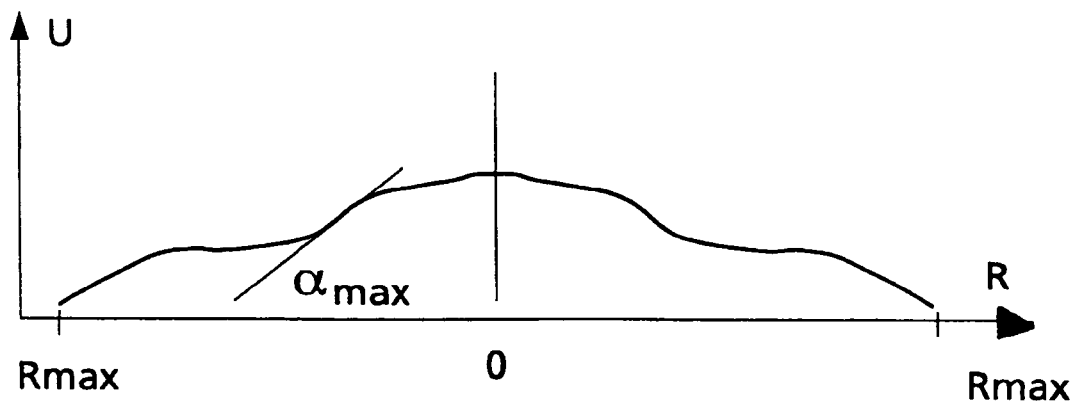
FIG. 14 shows the voltage drop for a transverse electrode with a variable cross section.

FIG. 14 shows a voltage drop corresponding to that in FIG. 13, but for a transverse electrode with a variable cross section. The voltage rise $\alpha$ varies in a corresponding way to the variation in the cross section although, in this case as well, it cannot exceed an upper value $\alpha max$.

Figure 15:
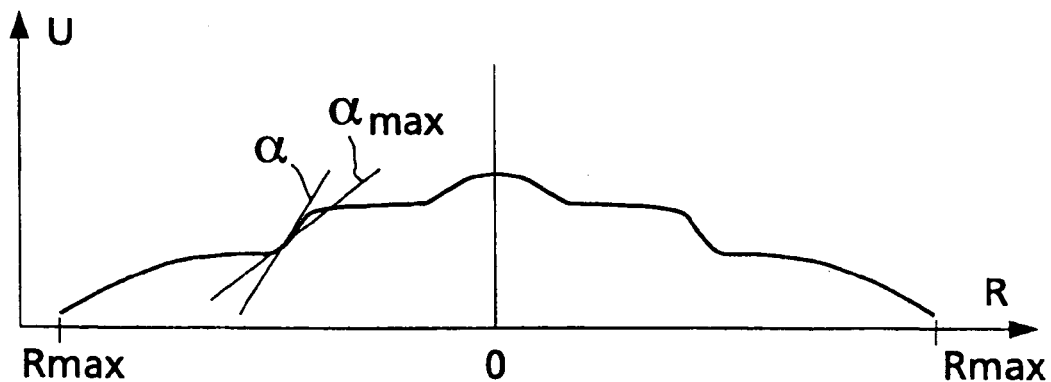
FIG. 15 shows the voltage drop for a transverse electrode with supply electrodes.

FIG. 15 shows a voltage drop corresponding to that in the previous figures, but using supply electrodes 35. The spreading and compression of the distances between the tapping points 37 which are possible in this case make it possible to achieve a gradient $\alpha$ which is greater than the $\alpha max$ in the previous diagrams. This is also due, inter alia, to the small cross section of the supply electrodes 35, which allow closer staggering.

The invention claimed is:

1. An optical compensation element having:
   a first transparent surface on which a transparent electrode is fit,
   a second transparent surface on which a plurality of transparent main electrodes are arranged, which are connected at one point, and only at one point, to a transverse electrode and, via this, to drive electrodes,
   a material which changes its refractive index as a function of the applied voltage and is arranged between the first and second transparent surface,
   wherein two or more main electrodes are in each case connected directly to one transverse electrode, and wherein the main electrodes are in the form of virtually closed rings with different radii, and are connected to the transverse electrode on the side opposite the opening.

2. The optical compensation element as claimed in claim 1, wherein the transverse electrode and the drive electrode are composed of the same material, with the transverse electrode cross section being smaller than the main electrode cross section.

3. The optical compensation element as claimed in claim 1, wherein at least one correction electrode is arranged between the main electrodes and can be driven by means of a further drive electrode.

4. The optical compensation element as claimed in claim 1, wherein different voltages can be applied to the drive electrodes.

5. An optical compensation element having:
   a first transparent surface on which a transparent electrode is fit,
   a second transparent surface on which a plurality of transparent main electrodes are arranged, which are connected at one point, and only one point, to a transverse electrode and, via this, to drive electrodes,
   a material which changes its refractive index as a function of the applied voltage and is arranged between the first and the second transparent surface, wherein the supply electrodes are arranged between the main electrodes and the transverse electrode and their contact points with the transverse electrode are arranged at unequal distances.

6. The optical compensation element as claimed in claim 5, wherein both the first and second transparent surfaces have structured electrodes.

7. An appliance for reading or writing to optical recording media, having a compensation element as claimed in claim 1.

8. An appliance for reading or writing to optical recording media, having a compensation element as claimed in claim 5.

* * * * *